US006411337B2

(12) United States Patent
Cove et al.

(10) Patent No.: US 6,411,337 B2
(45) Date of Patent: Jun. 25, 2002

(54) FUNCTION PRESENTATION AND SELECTION USING A ROTATABLE FUNCTION MENU

(75) Inventors: Jeffrey M. Cove, Plainfield, NJ (US); William S. Gray; Ernesto S. Villalobos, both of Chula Vista, CA (US)

(73) Assignee: Matsushita Electric Corporation of America, Secaucus, NJ (US)

(*) Notice: Subject to any disclaimer, the term of this patent is extended or adjusted under 35 U.S.C. 154(b) by 0 days.

(21) Appl. No.: 09/837,907

(22) Filed: Apr. 18, 2001

Related U.S. Application Data

(63) Continuation of application No. 08/955,983, filed on Oct. 22, 1997.

(51) Int. Cl.[7] ........................... H04N 5/445; H04N 5/50

(52) U.S. Cl. ....................... 348/563; 348/569; 348/570; 725/25; 725/37

(58) Field of Search ................................ 348/563, 564, 348/569, 570, 906, 734, 725; 345/112, 146, 116, 327, 328; 725/25, 37; H04N 5/445, 5/50

(56) References Cited

U.S. PATENT DOCUMENTS

| | | | | | |
|---|---|---|---|---|---|
| 4,498,098 | A | | 2/1985 | Stell | 358/22 |
| 4,559,569 | A | | 12/1985 | Otsuki et al. | 360/65 |
| 4,599,611 | A | | 7/1986 | Bowker et al. | 340/721 |
| 5,343,249 | A | | 8/1994 | Moon | 348/564 |
| 5,398,074 | A | | 3/1995 | Duffield et al. | 348/564 |
| 5,485,197 | A | * | 1/1996 | Hoarty | 348/7 |
| 5,528,316 | A | | 6/1996 | Lee | 348/725 |
| 5,534,942 | A | | 7/1996 | Beyers, Jr. et al. | 348/569 |
| 5,589,853 | A | | 12/1996 | Fujiki | 345/150 |
| 5,589,893 | A | | 12/1996 | Gaughan et al. | 348/734 |
| 5,627,564 | A | | 5/1997 | Yang | 345/146 |
| 5,640,502 | A | | 6/1997 | Knox et al. | 395/507 |
| 5,677,708 | A | * | 10/1997 | Matthews, III | 348/906 |
| 5,812,123 | A | * | 9/1998 | Rowe | 345/327 |
| 6,195,692 | B1 | * | 2/2001 | Hsu | 348/906 |

* cited by examiner

*Primary Examiner*—Sherrie Hsia
(74) *Attorney, Agent, or Firm*—Gray Cary Ware & Freidenrich

(57) ABSTRACT

Function representation and selection in a multi-function system that supports user selection of system function by means of a menu-driven graphical user interface includes displaying a rotatable function menu. The rotatable function menu includes a plurality of circumferentially-arrayed facets, each facet representing a respective function of a plurality of functions. The rotatable function menu may be rotated on an axis to place any desired facet at a selection location at which the function represented by the facet may be selected. Selection and configuration of functions and features related to a selected function are provided by display and navigation through one or more submenus.

10 Claims, 12 Drawing Sheets

(2 of 12 Drawing Sheet(s) Filed in Color)

FIG. 4
97
AUDIO
95
99
101
MODESTEREO SAP MONO
AUDIO ADJ.
AUDIO NORM SET
BASS
TREBLE
BALANCE

FUNCTION PRESENTATION AND SELECTION USING A ROTATABLE FUNCTION MENU

This is a continuation of U.S. patent application Ser. No. 08/955,983, filed Oct. 22, 1997, and entitled "FUNCTION PRESENTATION AND SELECTION USING A ROTATABLE MENU."

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates to processing system function selection by means of a menu displayed by the processing system. More particularly, the invention concerns the presentation and selection of television set functions by means of a rotatable function menu that is displayed on the screen of the television set and rotated thereon to present functions for user selection.

Modernly, the television set (TV) combines a display system with a sophisticated on-board processor that supports manifold functionality made accessible to a user by provision of on-screen, remote-control programming. Typically, a graphical user interface driven by user commands entered by way of a remote control device provides a display that either temporarily replaces or is integrated with TV program video. The display presents either alphanumeric or icon representations of TV functions ("function representations"). Thus the graphical user interface permits the user to interactively view and select TV functions.

Frequently, the graphical user interface for a TV is menu-driven, providing the display and supporting the selection of TV functions by means of menus. Such menus usually are laid out in flat, two-dimensional panels that provide "depth" by means of a hierarchical or tree-based sequence of menu panels. Pull-down menus are often used. This mode of presentation and selection is limited, requiring the user to view and select functions by navigation through successions of two-dimensional matrices. Other modes of presentation and selection are even more primitive.

Manifestly, there is a need for greater flexibility in presenting and supporting the selection of functions in a TV or, more broadly, in any multi-functional processor system in which function display and selection are provided by means of a menu-driven graphical user interface.

SUMMARY OF THE INVENTION

This invention satisfies the need by providing virtual "depth" in the presentation and manipulation of a function menu. The function menu in the invention includes a (virtually) three-dimensional graphics object that rotates in virtual space in response to user commands. A surface of the object is divided into a sequence of areas. Each area of the three dimensional, rotatable graphics object is assigned a function, with the assigned function being represented by graphical means in the area. The graphical representation may be alphanumeric, iconic, or both. The result is a rotatable function menu.

In the preferred embodiment of the invention, the rotatable function menu is substantially ring- or wheel-shaped, although other rotatable shapes are contemplated. A plurality of facets are arrayed circumferentially along an outer surface of the menu. The menu is rotated in response to user commands until the facet containing a desired function arrives at a selection location. The function of the facet in the selection location is referred to as the selected function. Further user commands may cause the display of one or more submenus for the selected function, each submenu containing a plurality of functions that are related to the selected function.

Manifestly, the invention organizes and presents functions in a novel way by provision of a function menu that is (virtually) rotatable in three dimensional space. The rotatable function menu adds flexibility, variety and richness to the visual presentation and selection of functions in the menu-driven graphical user interface of a multi-function system.

An object of the invention is to provide a function menu that is virtually rotatable in three-dimensional space. A further object is to provide for display and selection of functions in a multi-function system by means of a function menu that is virtually rotatable in three-dimensional space.

A still further object of the invention is to provide a function menu in the form of a ring- or wheel-shaped graphics object that can be virtually rotated in three-dimensional space.

Other objects and advantages of the invention will become evident when the following description is read with reference to the below-described drawings.

BRIEF DESCRIPTION OF THE DRAWINGS

The file of this patent contains at least one drawing executed in color.

DETAILED DESCRIPTION OF THE PREFERRED EMBODIMENTS

Figure 1:
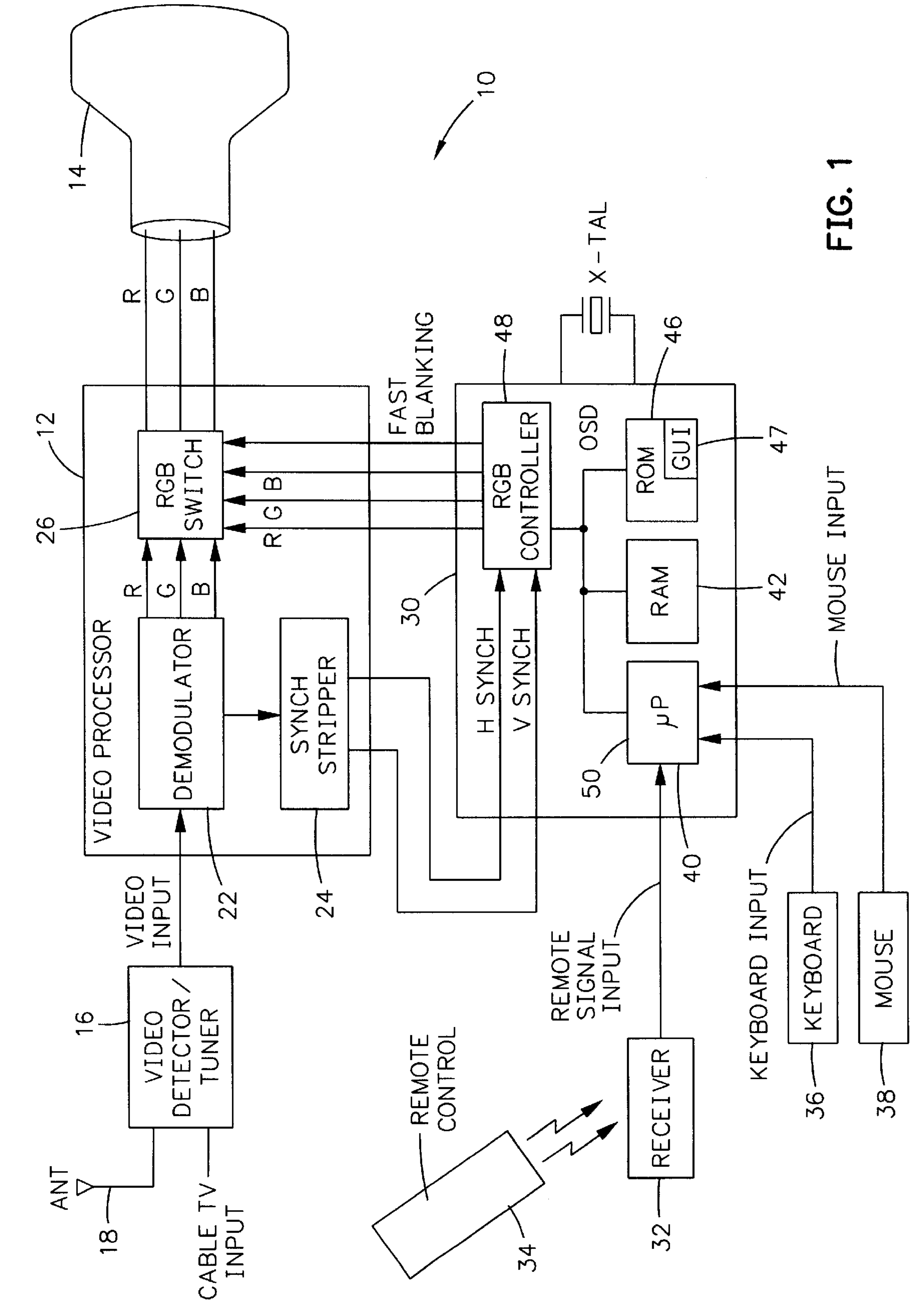
FIG. 1 is a block diagram of a multi-function processing system embodied as a TV set.

Referring now to FIG. 1, a processing system 10 is illustrated. Preferably, the processing system 10 is embodied in a television set (TV) (or a digital television set, or equivalent). Broadly, the invention is intended to be applied to any processing system utilizing a menu-driven graphical user interface for presentation and selection of functions performed by the processing system. The TV set may include a TV receiver, a set top box, a video cassette recorder (VCR), and/or any combination thereof.

In the preferred embodiment, the TV includes a video processor 12 that drives a display 14 by means of standard RGB (red/green/blue) signals. The video processor 12 receives a composite video signal from a video detector/tuner 16 to which an antenna 18 is coupled for the reception of broadcast TV signals. Manifestly, the video detector/tuner 16 may also be connected to other means of TV signal distribution, including, but not limited to, a CATV cable, a satellite receiver, and so on. The video processor 12 has a standard architecture including a demodulator 22 that receives the video signal and decomposes it into a set of signals necessary to operate the TV. The demodulator 22 is connected to a synchronization extractor (synch stripper 24). Included in the signals generated by the synch stripper 24 are a horizontal synchronization (HSYNCH) signal and a vertical synchronization (VSYNCH) signal. The demodulator 22 also extracts the RGB signals necessary to drive the display 14, providing them to an RGB switch 26. The TV also includes processor system 30 provided for the execution of the plurality of TV functions, including, but not limited to, channel switching, volume control, VCR operation, day/time setting, and so on. The processor system may be embodied in a programmable, general purpose digital processor, or an application-specific integrated circuit. The processor system maybe embodied in a TV receiver, a set top box, or a VCR, for example. In the preferred embodiment, the processor system 30 has a conventional architecture that includes a microprocessor IC 40, random access memory (RAM) 42, and read only memory (ROM) 46 in which the computer programs for function execution, graphical user interface execution, and execution of a method embodying the invention are stored. The processor system 30 also includes an RGB controller 48. The processor system elements 40, 42, 46, and 48 (and others not shown, but inherent) are coupled by a databus 50. The RGB controller 48 is connected to the RGB switch 26 in the video processor 12 to provide graphics RGB signals that form the display produced by the graphical user interface. The RGB switch 26 integrates the graphics signals provided by the RGB controller 48 with the TV video provided by the demodulator 22 for display on the screen 14. Synchronization of graphics produced by the processor system 30 with the TV video is provided by the HSYNCH and VSYNCH signals provided to the RGB controller 48, and by a FAST BLANKING signal provided by the RGB controller 48 to the RGB switch 26. The microprocessor IC 40 is connected to a receiver 32 that receives user inputs transmitted from a remote control device 34. The remote control device 34 is conventional, including a number of buttons providing standard commands for navigation and selection that control the microprocessor IC 40 in the execution of programs stored in ROM 46. Navigation and selection commands may also be received by the microprocessor IC 40 from a conventional QWERTY keyboard 36 and/or a mouse 38.

The ROM 46 in FIG. 1 includes a graphical user interface (GUI) computer program 47 that supports interaction between a user and the processing system 10 by way of one or more input devices such as remote control 34, keyboard 36, and/or mouse 38 (or joystick, not shown). The GUI program generates the displays that present to the user representations of functions ("function representations") and that provide visual feedback to the user which indicates the user's navigation through and selection of functions that are represented in the displays. Any GUI in which the invention is implemented is presumed to comprise components of virtual reality programming including three-dimensional representation of graphics objects to simulate three-dimensional space, animation to simulate motion of graphics objects in space, and programming to enable the user to control the animation by conventional navigation and selection commands. Thus, when terms such as "three dimensions", "three dimensional", "isometric", "rotatable", and "rotation", are used it is understood that virtual representation on a two-dimensional display surface is intended, as well as presentation on any actual three-dimensional display means.

Figure 2:
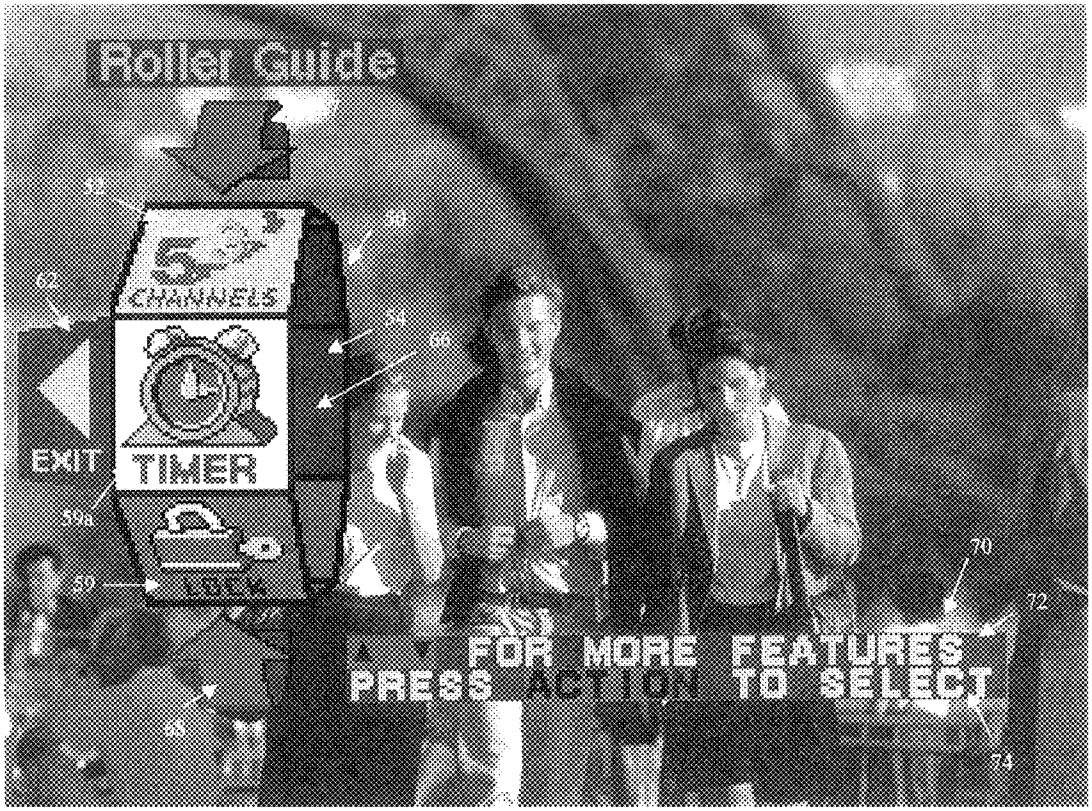
FIG. 2 is an illustration of a rotatable function menu in the form of a ring- or wheel-shaped graphics object that can be virtually rotated in three-dimensional space.

Turning now to FIG. 2, an embodiment of the invention is described with reference to a function menu 50. The function menu 50 is ring- or wheel-shaped, having an outside circumferential surface 52. In the preferred embodiment, the function menu 50 is an annulus that is observed isometrically so that an inside circumferential surface 54 is also presented. Alternatively, this embodiment of the function menu 50 may be presented as a solid ring or disk. The outside circumferential surface is composed of a sequence of facets, one of which is indicated at 59. In the example shown, each facet of the function menu includes a perimeter that encloses an essentially square-shaped area, as best seen with reference to the middle facet at location 59*a*. Immediately adjacent to, and preferably touching, the facet at location 59*a* is a facet 62 that is separate from the function menu 50. In response to user commands, the function menu 50 is rotated on an axis that is represented by the line 66. Preferably, as illustrated in FIG. 2, the axis represented by the line 66 is substantially horizontal. The directions of rotation are indicated by the arrows 67 and 68. Rotation of the function menu 50 is incremental, with the menu rotating through an arc sufficient to carry one of the facets above or below the facet at location 59*a* to the location 59*a*, with the facet at that location being rotated by one facet's angular distance below or above the location 59*a* illustrated in FIG. 2. Thus, assume rotation in the direction indicated by the arrow 67 and an increment of rotation which would carry the facet with the title TIMER and including an icon representing a clock down to the position occupied by the facet with the title LOCK and including an icon representing a lock, while the facet with the title CHANNELS would travel to the position previously occupied by the TIMER facet. Preferably, during rotation, the facet 62, labeled EXIT, is stationary. Manifestly, the facet of the function menu 50 that is immediately adjacent to, or touching, the EXIT facet is in the "select" location 59*a*. During rotation of the rotatable function menu 50, a HELP panel 70, containing two fields 72 and 74 is displayed. The upper field 72 indicates two buttons on the remote control 34 operated by the user (or corresponding arrow buttons on a keyboard, or movement by a mouse) which, when activated, will rotate the rotatable function menu 50 in the direction indicated on the respective arrow button. The lower field 74 indicates to the user that the ACTION button on the remote control 34 (or a corresponding key on a keyboard, or button on a mouse) will result in selection of the function represented by the facet at the select location 59*a*. In this case the function is referred to as the "select function".

As will be appreciated with reference to FIG. 2, each facet of the rotatable function menu 50 represents a function that the processor system 30 is capable of performing. For example, those functions represented by the facets illustrated in FIG. 2 include channel changing or setting in the CHANNELS facet, timer setting in the TIMER facet, and a lock function in the LOCK facet. Conventionally, the function represented by a facet is linked to the function representation that is contained within the facet so that a user selection action (such as pressing the ACTION button) will select the function for execution by the processor system 30.

Figure 3:
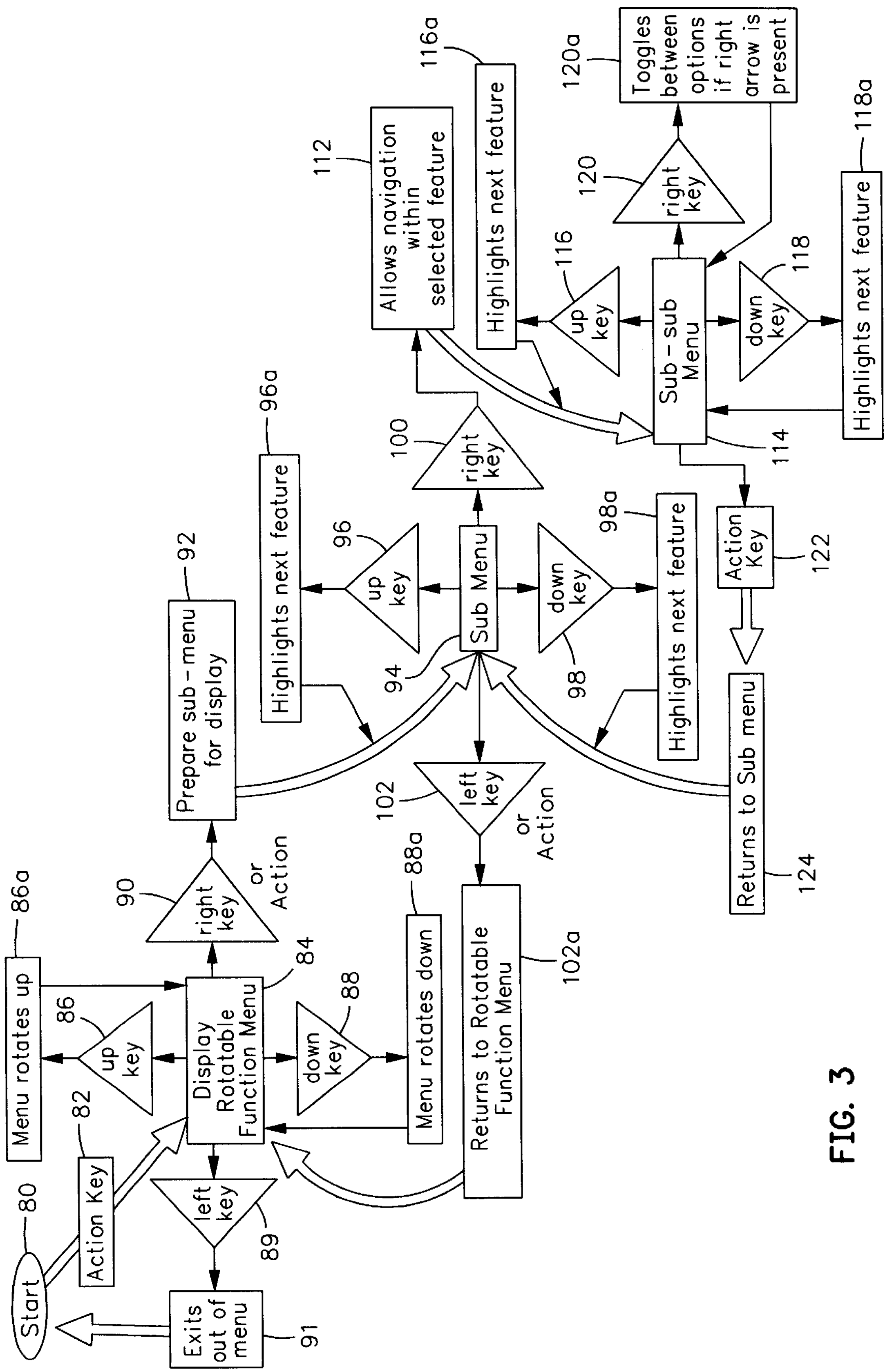
FIG. 3 is a flow diagram representing a software program that executes the method of the invention.
Figure 4:
FIG. 4 illustrates a sub-menu associated with a selected function represented in a facet of the function menu shown in FIG. 2.

Referring now to FIG. 3, function representation and selection using a rotatable function menu such as that illustrated in FIG. 2 will be explained. FIG. 3 represents a computer program executable by, for example, the processor system 30, or any other general purpose digital processing system programmed and equipped to execute a graphical user interface. Again in the explanation of FIG. 3 it is assumed that a user is operating an input device, such as the remote control 34, having buttons that represent navigation, exit, and selection commands. At minimum the navigation commands are activated, respectively, by UP and DOWN keys. An EXIT command is input by the LEFT key, while the RIGHT key enters a SELECT command. In addition, the provision of an ACTION key or equivalent is presumed. The method of the invention begins in step 80 from which transition is made to step 84 by pressing the ACTION key in step 82. In step 84 the rotatable function menu, such as the menu 50 of FIG. 2 is displayed. For so long as the rotatable function menu is displayed, activation of the UP key in step 86 will rotate the menu 50, in step 86*a*, in the direction indicated by the arrow 68. This corresponds to entry of a first ROTATION command. Rotation is, preferably, incremented by one facet, with the facet at location 59*a* representing the selected function. The depression of the DOWN key (entry of a second ROTATION command) in step 88 will rotate the menu, in step 88*a*, in the direction indicated by the arrow 67 of FIG. 2 by one facet, with return to step 84. The program exits from step 84 by depression of the LEFT key 89, which carries the method through step 91 back to the start state represented by the step 80. From step 84, selection of the function in the select location is indicated by depression of the RIGHT key in step 90 (or the ACTION key) which carries the method to step 92, where a submenu is prepared for display of a plurality of functions and/or features that are related to the selected function represented by the facet of the rotatable function menu in the select position. The rotatable function menu 50 is deleted from the display and the submenu is displayed in step 94. Alternatively, the submenu may be displayed when its related function representation is rotated to the select location. As should be evident, step 89 may be considered to be entry of a SELECT command by the user. Reference to FIG. 4 illustrates steps 92 and 94. In FIG. 4, assume that the rotatable function menu 50 in FIG. 2 has been rotated to place a facet labeled AUDIO and containing an icon of a speaker to the select position. This means that the AUDIO function is the selected function. In step 92, a submenu is prepared that lists functions classed as AUDIO functions. This submenu is indicated by reference numeral 95 in FIG. 4. If desired, the facet of the rotatable function menu that is in the select position may be displayed together with the submenu that results from selection of the represented function. In this case, the facet 97 containing the AUDIO label is shown overlapping the submenu 95. Returning to the explanation of the method and referring once again to FIG. 3, from step 94, navigation through the displayed submenu is provided by depression of either the UP or DOWN key. For example, presuming display of the submenu 95 in FIG. 4, four functions related to the selected function are listed in a two dimensional function submenu format, with a selected function indicated by highlighting. In this case, as shown in FIG. 4 the AUDIO ADJUST function is highlighted. Depression of the DOWN key in step 98 will move the highlighting downwardly through the submenu 95, one listed function per depression, so that the highlighting will be moved to the next function beneath AUDIO ADJUST in the submenu, and so on. From step 98*a*, the method returns to step 94. Similarly, use of the UP key in step 96 will move the highlighting upwardly in the submenu being displayed, with transition back to display of the submenu by way of steps 96*a*, 94. Note that the submenu 95 provides a RIGHT key icon 99 at the right-hand end of each listed function. This indicates that the RIGHT key may be used with the submenu. Use of the RIGHT key in step 100 allows navigation within a selected feature (step 112) by causing two events. First, another submenu, such as the submenu 101 in FIG. 4, may be prepared for the function that is highlighted in the submenu 95. Next, the other submenu, termed the sub-submenu, is displayed, with highlighting, in step 114. Navigation in the sub-submenu from step 114 is provided by way of the UP key, which shifts the highlight up in the sub-submenu list and then returns to display of the sub-submenu in steps 114, 116, 116*a*, 114. Similarly use of the DOWN key moves the highlighting downwardly in the sub-submenu by the sequence 114, 118, 118*a*, 114. In the preferred embodiment illustrated in FIG. 4, activation of the RIGHT key in step 120 may toggle in step 120*a* between options for a highlighted function in the sub-submenu 101, assuming the presence of a RIGHT key icon in the display. Depression of the ACTION key in step 122 cancels the highlighting in sub-submenu 101 and transfers it through step 124 back to the last selected function in the submenu 95. From the submenu 95, return to the display of the rotatable function menu 50 is by way of depression of the LEFT key (or ACTION key) in step 102, preparation of the rotatable function menu for display in step 102*a*, and display of the rotatable function menu in step 84.

Figure 5:
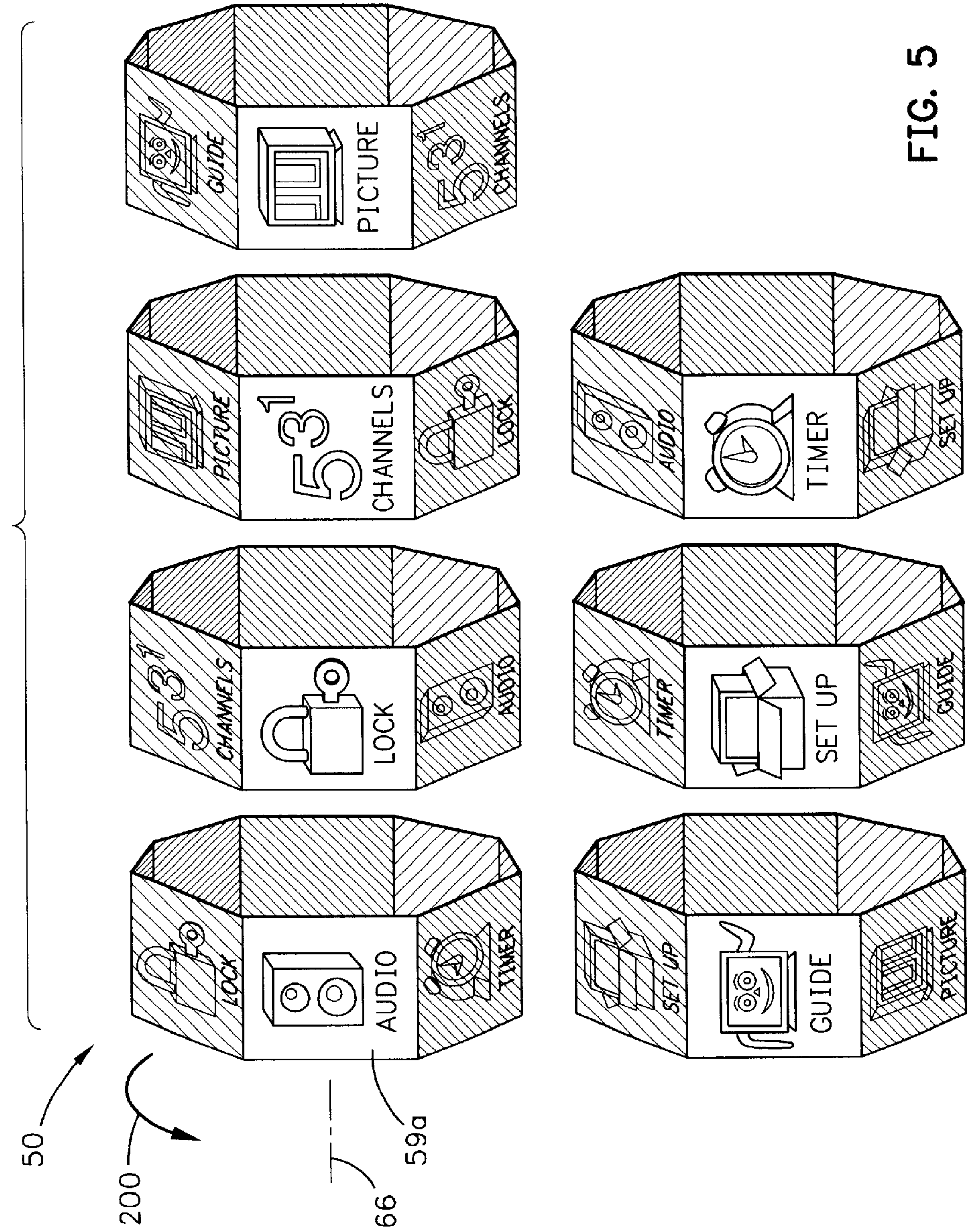
FIG. 5 illustrates the rotation of the rotatable function menu through a select location.

FIG. 5 illustrates a complete rotation the rotatable function menu 50, thereby disclosing all members of a set of functions that are displayed for selection by rotatable function menu. Beginning with rotation of the rotatable function menu 50 to place the AUDIO facet in the selection location 59*a*, and assuming rotation of the rotatable function menu 50 in the direction arrow of 200, on the axis represented by the line 66, depression of the DOWN arrow on the remote control 34 six times produces six rotational increments of the rotatable function menu 50, presenting the following sequence of functions for selection by the user: AUDIO, LOCK, CHANNELS, PICTURE, GUIDE, SET UP, TIMER. This is not intended to limit the number or set of functions, or to establish a particular sequence, but rather only to present an illustrative example.

Figure 6:
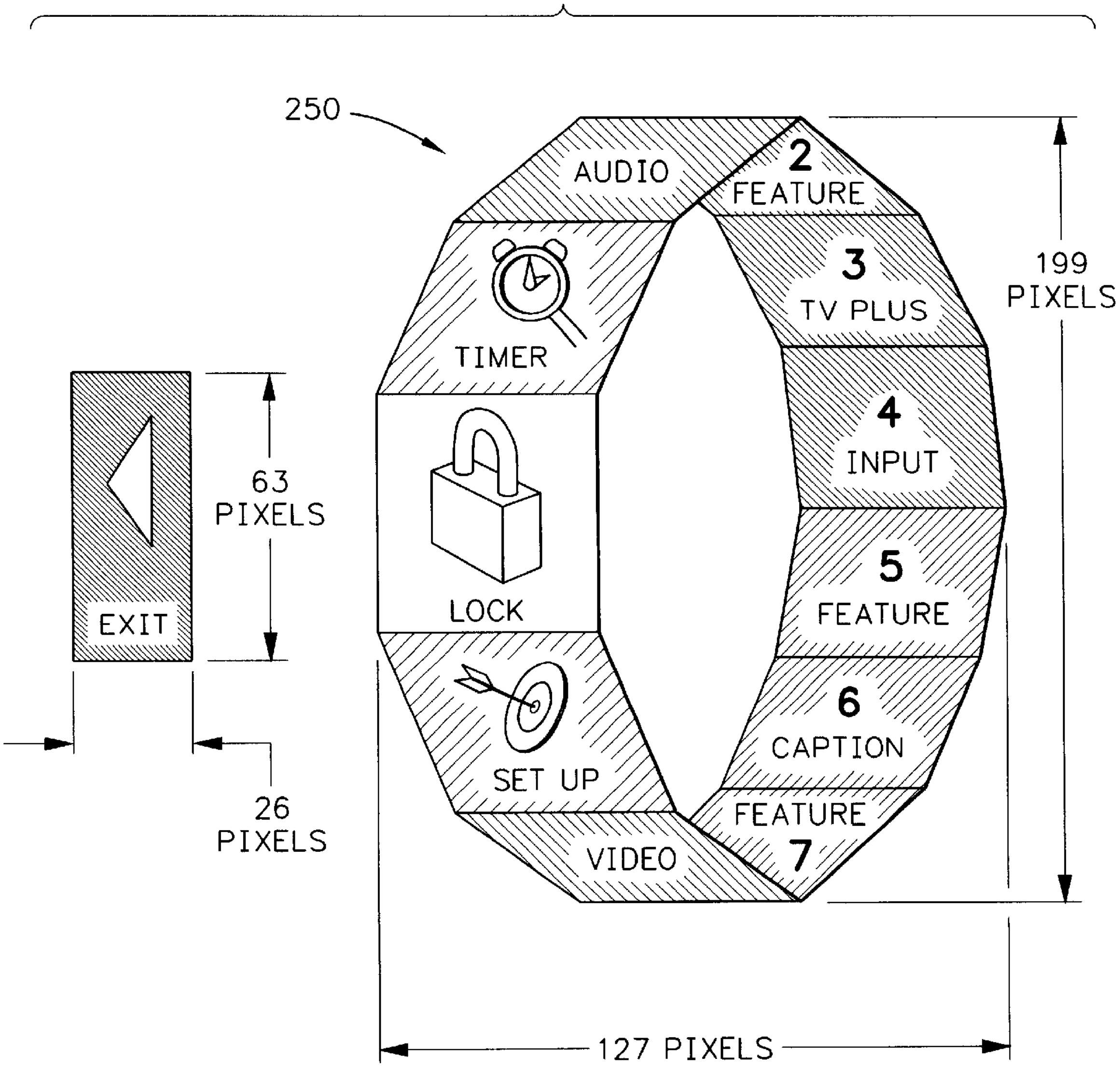
FIG. 6 illustrates a variation of the preferred embodiment of the rotatable function menu.

FIG. 6 illustrates another embodiment of the rotatable function menu, by a rotatable function menu 250 having eleven facets that permit the presentation of eleven functions for selection. The axis of rotation of the rotatable function menu 250 is pivoted to increase the angle of the isometric view. In addition, representative dimensions in pixels are given for the apparent diameter of the rotatable function menu 250, for the width of its projection onto the screen where it is displayed, and for the length and width of the EXIT facet.

Figure 7C:
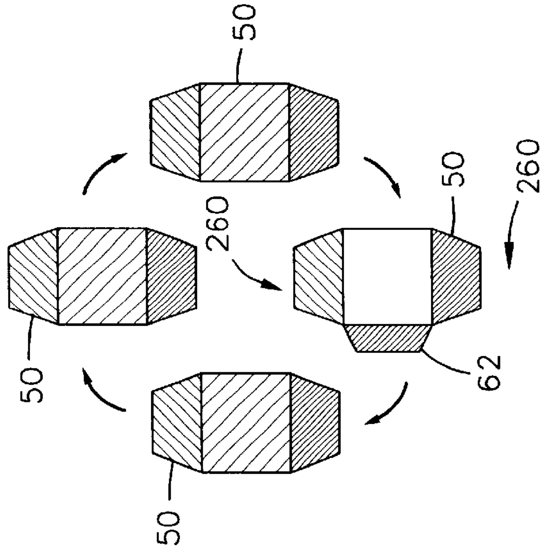
FIGS. 7A–7E illustrate respective graphics objects by which the rotatable function menu may be implemented.
Figure 7B:
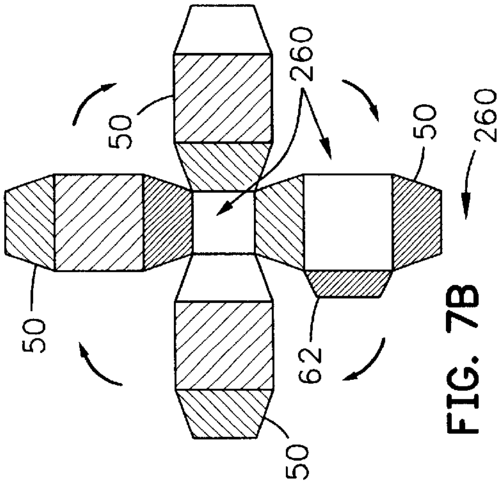
Figure 7A:
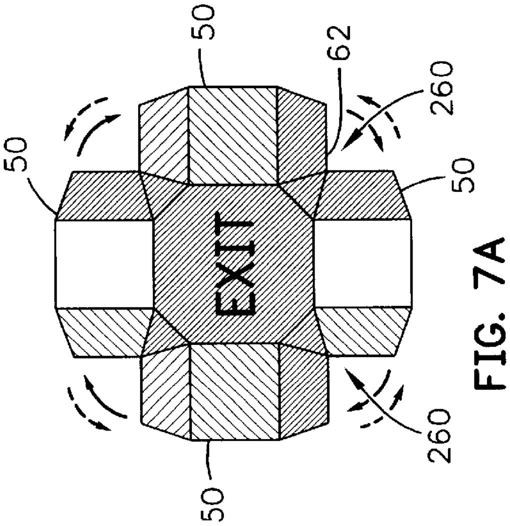
Figure 7E:
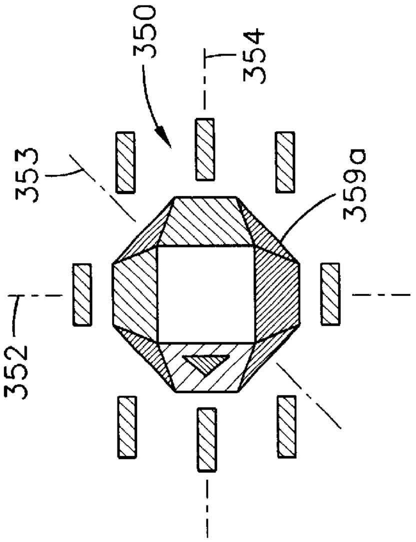
Figure 7D:
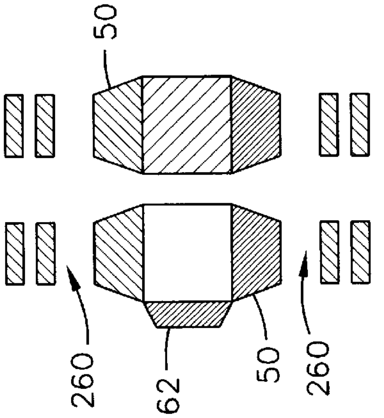

FIGS. 7A–7E illustrate various configurations that incorporate a plurality of rotatable function menus. In FIGS. 7A–7D, the rotatable function menus all have the ring or wheel shape of the rotatable function menu illustrated in FIG. 2 and are therefore indicated by reference numeral 50. In each of these configurations a stationary EXIT facet 62 is provided at a location that touches at least one of the rotatable function menus 50. In FIG. 7A, four rotatable function menus 50 are presented, forming a cross by disposing the EXIT facet 62 at a central location and placing each of the rotatable function menus 50 into an abutting relationship with the EXIT facet 62 so that their axes of rotation meet in the center of the cross. In this configuration, the entire cross structure can be rotated either clockwise or counter-clockwise in order to place one rotatable function menu 50 in an active location bracketed between the two arrow icons 260. The rotatable function menu 50 in the active location is the one that is rotated on its axis for function selection. In FIG. 7B, the cross configuration is varied by aligning the rotatable function menus 50 so that their radial projections intersect in the middle of the cross configuration. This array may also be rotated clockwise or counter-clockwise so that one rotatable function menu 50 may be first rotated to the active location bracketed between the arrow icons 260 and, in that location, rotated on its axis as described above. In FIG. 7B, the EXIT facet remains stationary in the position shown during rotation of the cross configuration. FIG. 7C illustrates another cross configuration in which the rotatable function menus 50 are displayed substantially vertically upright while being rotated to the active location between the arrow icons 260 and while being rotated for function selection at the active location. FIG. 7D illustrates parallel rotatable function menus 50 that can be activated either by changing the locations of the arrow icons 260 and the EXIT facet 62 or by exchanging the locations of the rotatable function menus 50. In FIG. 7E, a rotatable function menu 350 in the form of a multi-faceted sphere is illustrated. This embodiment of my rotatable function menu permits rotation of the multi-faceted sphere on any of the plurality of axes, such as axes 352–354, that bisect the sphere, such that the facets may be rotated to the select location 359*a* by rotation of the sphere about one or more of the plurality of axes so the facets of the rotatable function menu 350 come into the select location 359*a* vertically, horizontally, or obliquely. Alternatively, the multi-faceted sphere could be first rotated to position one of a plurality of circumferential bands of facets to an active location, say to the position where the circumferential band is substantially equatorial, and then rotated on its vertical axis for function selection.

As should be apparent from the reading of the forgoing Detailed Description and from contemplation of the above-described figures, the rotatable function menu is not intended to be limited to any particular rotation configuration or orientation. Thus, for example, the ring- or wheel-shaped configuration of FIG. 2 can be rotated about an axis that is substantially horizontal, substantially vertical, or rotated to any location between the horizontal and vertical. The configuration can be a disc. Further, this configuration can be presented isometrically or as a front or side elevation. Alternatively, one or more ring- or wheel-shaped rotatable function menus may be displayed for function presentation and selection. Moreover, the rotatable function menu may be rendered in other rotatable shapes such as, for example, the multi-faceted sphere of FIG. 7E.

Figure 8A:
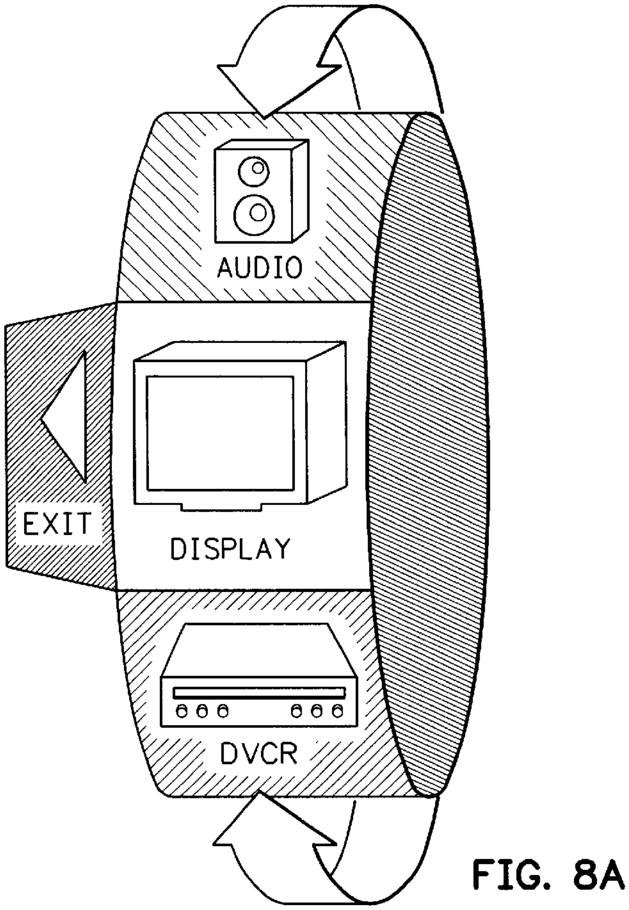
FIGS. 8A and 8B illustrate other embodiments of the rotatable function menu.
Figure 8B:
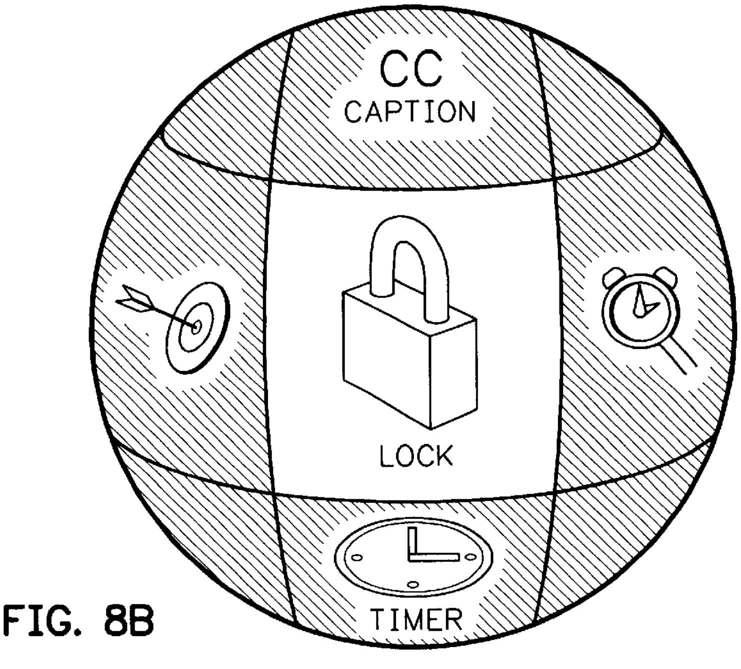

As FIGS. 8A and 8B indicate, the rotatable function menu may be embodied in a cylindrical or spherical shape without the square facets illustrated and described above. In each case, the outer surface of the menu is divided into one or more sequences of discrete areas or area portions that are arrayed circumferentially along the surface. Further, in the cylindrical rotatable function menu illustrated in FIG. 8A, the shape may be a hollow, annular ring, or may be a solid disc.

Figure 9A:
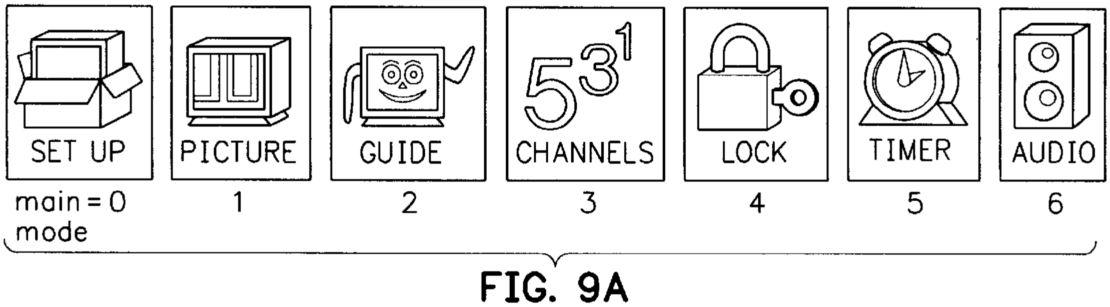
FIGS. 9A–9K illustrate how rotation of the rotatable function menu may be animated.

FIGS. 9A–9K, taken together with FIGS. 10A–10E, illustrate how animation of the rotatable function menu may be performed by means embodied in computer software. Assuming a function set and sequence as illustrated in FIG. 9A, animation of the upward rotation of the rotatable function menu 50 may be understood with reference to FIGS. 9B–9F. Assume that an upward rotation animation sequence begins in FIG. 9B where the rotatable function menu 50 is shown, prior to commencement of rotation, with the SET UP facet at the select location 59*a*. Upon receipt of a rotation signal, such as depression of an UP arrow key on the remote control 34, the animation sequence begins in FIG. 9C by blanking out the function representation in all of the facets and displaying the rotatable function menu 50 rotated upwardly through an arc that appears to place the clear (or white) facet formerly at location 59*a* in position in 59*b*. Next, in FIG. 9D the facet that is being rotated upwardly from the select location 59*a* is darkened and the facet that is next to be rotated up into the location 59*a* is whitened, while the rotatable function menu is rotated through an arc that places the facet being rotated to the select location in location 59*c*. Then in FIGS. 9E and 9F, the function representation next in sequence following the SET Up facet when the rotatable function menu 50 is rotated upwardly is displayed in the white facet at location 59*a*.

It should be clear that blanking of one or more facets merely reflects hardware and software limitations. It is contemplated that microcomputer speed and the instruction repertoire would be capable of rotating the function menu to include the contents of the facets, without blanking.

Manifestly, with reference to the animation sequence illustrated in FIGS. 9B–9F, it will be appreciated that upward rotation through the sequence of functions illustrated in FIG. 9A proceeds to the right. For example, the SET UP function representation was followed by the PICTURE function representation in the upward rotation sequence just described. Conversely, a leftward traversal of the sequence illustrated in FIG. 9A corresponds to a downward rotation animation sequence. In either case, circular progression is provided by wrap-around between the SET UP and AUDIO functional representations.

Figure 10A:
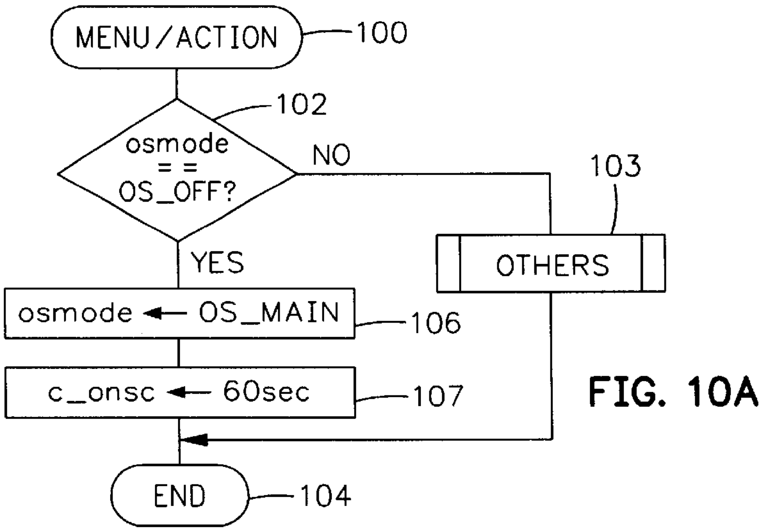
FIGS. 10A–10E illustrate a software program embodying functions that are executed to rotate the rotatable function menu.
Figure 10B:
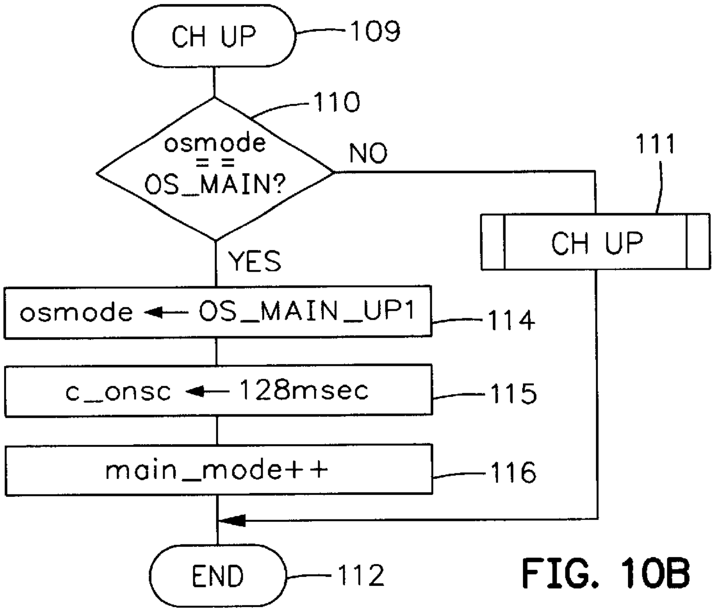
Figure 10C:
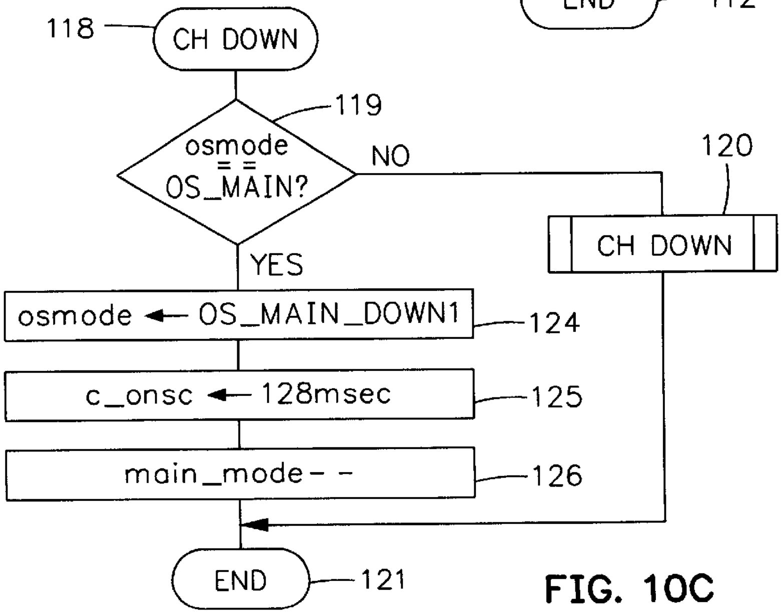

FIGS. 10A–10B illustrate a sequence of program steps embodying rotation of the rotatable function menu 50 that may be embodied, for example, in the GUI program 47 stored in the ROM 46 of the on board processor 30 illustrated in FIG. 1. Assume initially that display of the rotatable function menu 50 is signified by the state of an on screen mode flag (osmode). If the flag is set to OS_OFF, the on screen mode is off, meaning that the rotatable function menu 50 is not being displayed. Assume activation of an ACTION button on the remote control 34 by a user in step 100 of a mode check routine illustrated in FIG. 10A. In step 102, the state of osmode is checked. If osmode is not set to OS_OFF, the negative exit is taken from step 102, other functions are performed in step 103, and the routine exits in step 104. On the other hand, if osmode is set to OS_OFF, the positive exit is taken from step 102 and osmode is reset to a state OS_MAIN in step 106. This causes the rotatable function menu 50 to be displayed in an initial state that places a predetermined function representation at the select location 59*a*. In the preferred embodiment, the initial display of the rotatable function 50 in step 106 places the SET UP function representation in the white facet at location 59*a*. At the same time a main_mode flag is set to a value that corresponds to the function representation currently being displayed at location 59*a*. Reference to FIG. 9A shows a mapping between the state of the main_mode flag and the function representation displayed at the select location 59*a*. As will be appreciated, the main mode states are numerical and sequence incrementally in value. In the example given in FIG. 9A, the main_mode values map to function representations as follows: 0=SET UP; 1=PICTURE; 2=GUIDE; 3=CHANNELS; 4=LOCK; 5=TIMER, AND 6=AUDIO. Returning to FIG. 10A, immediately upon the setting of osmode to OS_MAIN and display of the rotatable function menu 50 in step 106, a clock c_onsc is initialized to 60seconds in step 107. The clock c_onsc counts down from its initial setting until it is either reset or reaches zero. When c_onsc counts down to zero, display of the rotatable function menu 50 ceases.

Figure 9B:
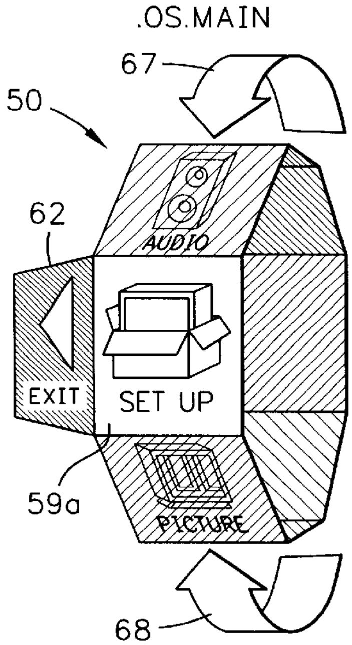
Figure 9C:
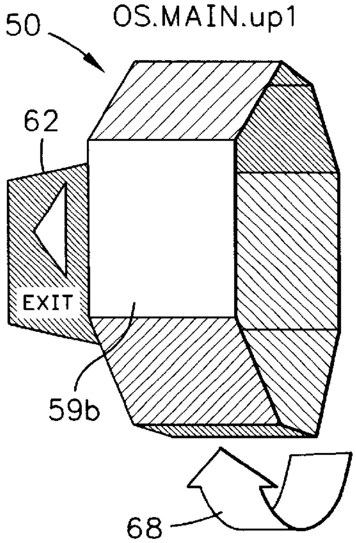
Figure 9D:
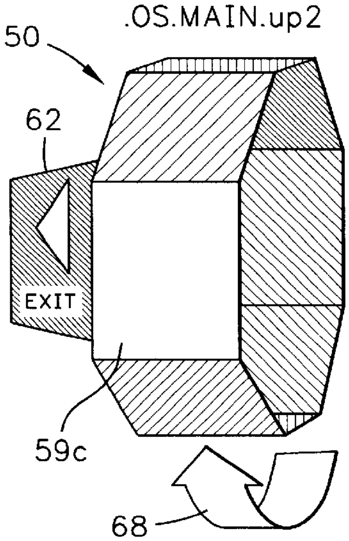
Figure 9E:
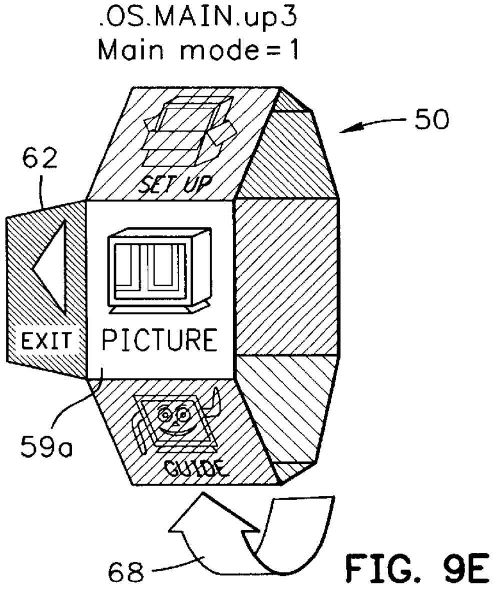
Figure 9F:
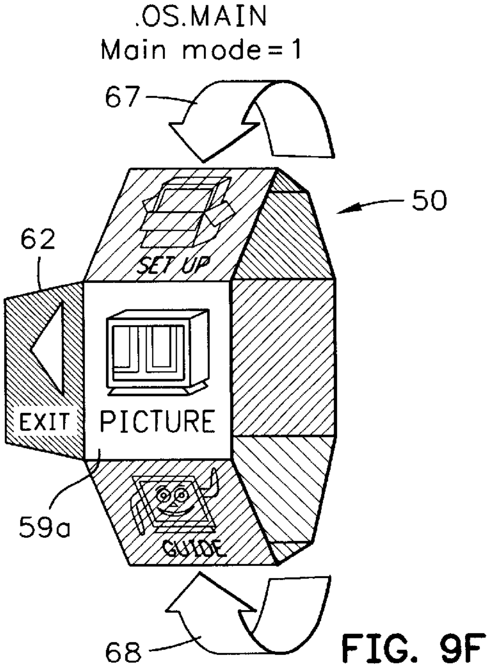
Figure 9G:
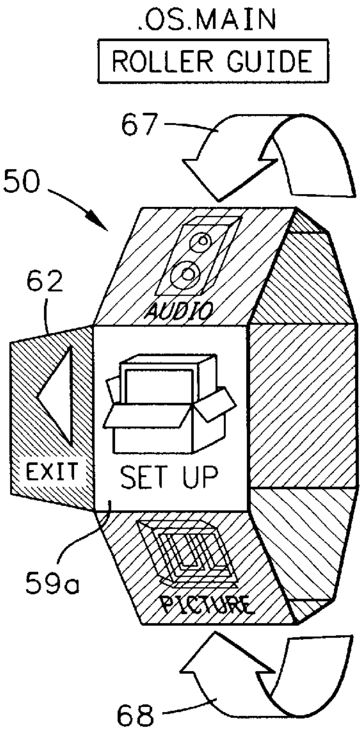
Figure 9H:
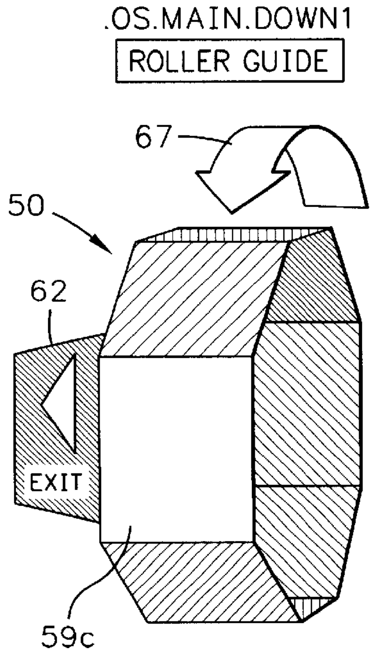
Figure 9I:
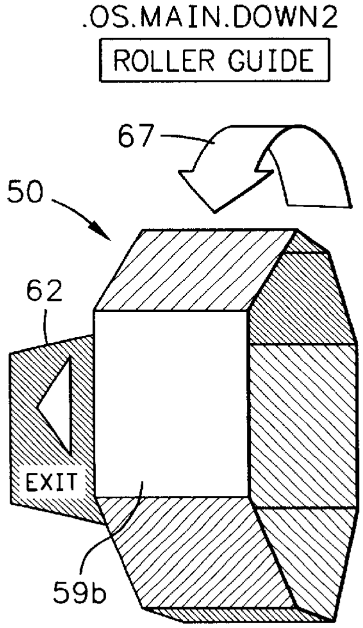
Figure 9J:
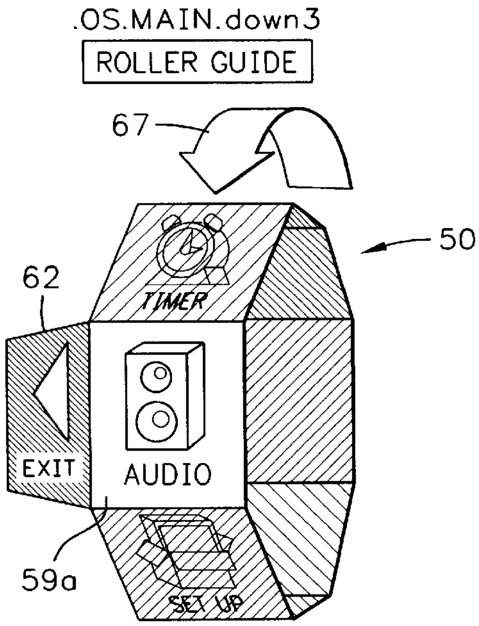
Figure 9K:
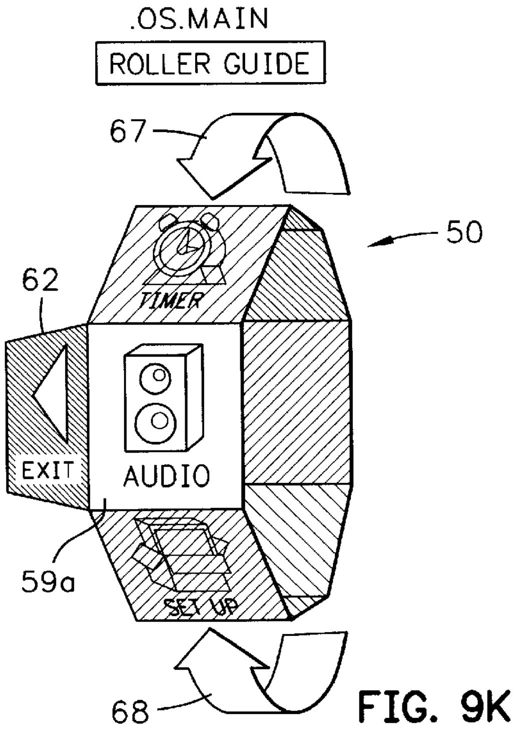

For rotation of the rotatable function menu, assume response to the channel arrow keys (CH UP indicating depression of the UP arrow, and CH DOWN, the DOWN arrow). Assume depression of the UP channel arrow on the remote control 34 in step 109 of FIG. 10B. In step 110 the state of osmode is tested. If osmode is not set to the OS_MAIN state, the negative exit is taken from step 110 and the channel is incremented in step 111. The routine ends in step 112. On the other hand, if osmode is set to OS_MAIN, the positive exit is taken from step 110. In step 114, the state of osmode is changed to OS_MAIN_UP1, and the rotatable function menu 50 is rotated as shown in FIG. 9C. Virtually simultaneously, in steps 115 and 116, c_onsc is reset to 128 msec and the state of the main_mode flag is incremented by one. The routine of FIG. 10B ends at 112 either with the channel incremented or with the rotatable function menu 50 rotated to the position shown in FIG. 9C. Note that when the rotatable function menu 50 is displayed with osmode set to OS_MAIN_UP1, only the arrow 68 is included in the display, indicating to the user that the rotatable function menu 50 is being rotated in the upward direction.

Figure 10E:
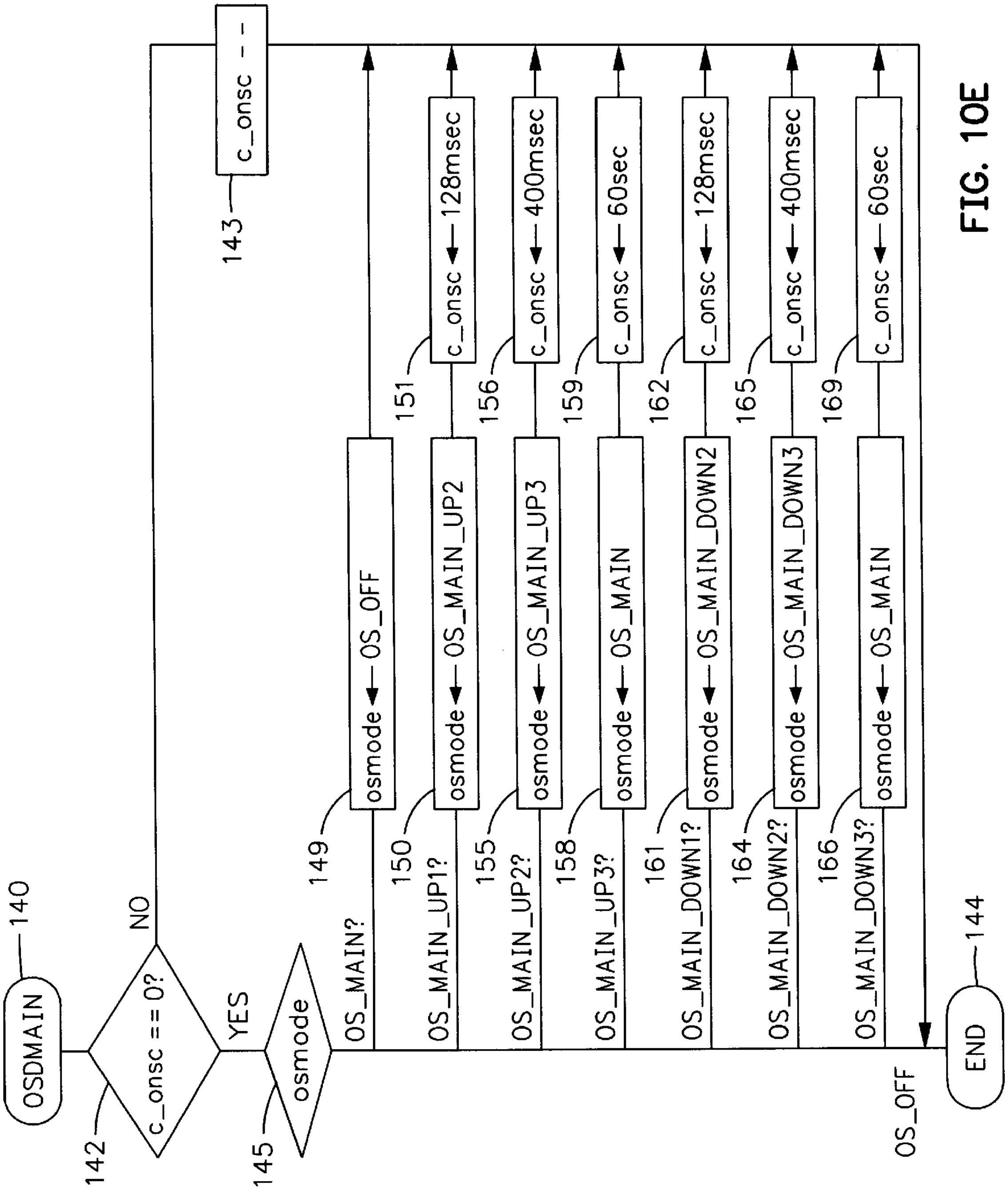
Figure 10D:
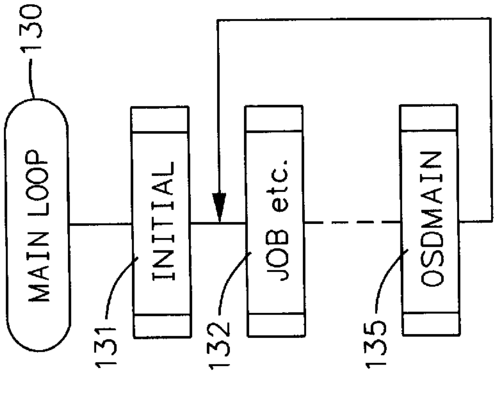

The operation of the on board processor 30 is controlled by a main loop program illustrated in FIG. 10D. The main loop program of FIG. 10D is initiated in step 130 when the on board processor 30 is turned on or booted, initial conditions are set in step 131, and a loop of routines 132 . . . 135 132 is entered. The on screen display main routine (OSDMAIN) 135 is a component of this loop. The OSDMAIN routine 135, illustrated in FIG. 10E, is entered in step 140. The OSDMAIN routine 135 is keyed by the current value of c_onsc, which is tested in step 142. If c_onsc has not counted down to zero, the negative exit is taken from step 142 and the count down of the clock continues in step 143, while the OSDMAIN routine is exited in step 144. On the other hand, if c_onsc has a value of zero in step 142, the positive exit is taken and the state of osmode is tested in step 148. If the flag is set to OS_OFF, the rotatable function menu 50 is not being displayed and the routine ends in step 144. If the flag is set to OS_MAIN, the OSDMAIN routine in step 149 sets the flag to OS_OFF, display of the rotatable function menu 50 ceases, and OSDMAIN ends in step 144. If osmode is set to OS_MAIN_UP1, signifying the first step in an upward rotation of the rotatable function menu 50, as illustrated in FIG. 9C, the OSDMAIN routine resets osmode to OS_MAIN_UP2 in step 150, resets c_onsc to 128 msec in step 151, and ends in step 144. If osmode is set to OS_MAIN_UP2, the OSDMAIN routine changes the state of osmode to OS_MAIN_UP3 in step 155, resets c_onsc to 400 msec in step 156, and ends in step 144. The sequence 155, 156, 144 results in upward rotation of the rotatable function menu 50 to the position illustrated in FIG. 9E, with the function representation in the facet at location 59*a* displayed according to the state of the main_mode flag. In FIG. 9B, the example shows the main_mode flag set to 1, resulting in display of the PICTURE function representation at location 59*a*. However, since this represents the end of an upward rotation sequence, only the arrow 68 is displayed. Now with reference again to FIG. 10E, assuming that the test in step 148 shows that osmode is in the state OS_MAIN_UP3 (FIG. 9E) osmode is reset to OS_MAIN is step 158, the arrow 67 is added to the display, and the clock c_onsc in reset for a 60 second display of the rotatable function menu in step 159.

The explanation of FIGS. 9A–9F and 10A–10E to this point has described the initiation of the display of the rotatable function menu 50 and animation of an upward rotation of the menu by one facet through the sequence illustrated in FIGS. 9B–9F. As those skilled in the art will appreciate, downward rotation of the rotatable function menu 50 is initiated by the routine of FIG. 10C when the DOWN channel arrow is pushed in step 118 and osmode is tested in step 119. With no display of the menu 50, the negative exit is taken from step 119, the channel is decremented in step 120, and the routine ends in step 121. On the other hand, if the DOWN arrow is pushed while the rotatable function menu 50 is being displayed, the positive exit is taken from step 119, which results in setting the osmode flag to OS_MAIN_DOWN1 in step 124, setting c_onsc to 128 msec in step 125, and decrementing the value of main_mode in step 126. This initiates a downward rotation sequence of the rotatable function menu 50 which is illustrated in FIGS. 9G–9K where the location sequence for the white facet is 59*a*, 59*c*, 59*b*, and back to 59*a* in FIGS. 9J and 9K. During downward rotation, only the arrow 67 is shown in FIGS. 9A–9J. Once downward rotation has completed, the arrow 68 is restored to the display in FIG. 9K. The downward rotation animation sequence is performed by the OSDMAIN routine 135 by sequencing the value of osmode out of step 148 through the values OS_MAIN_DOWN1 (through steps 161 and 162), OS_MAIN_DOWN2 (through steps 164 and 165), OS_MAIN_DOWN3 (through steps 168 and 169), OS_MAIN.

Many modifications and variations of the invention will be evident to those skilled in the art. It is understood that such variations may deviate from specific teachings of this description without departing from the essence of the invention, which is expressed in the following claims.

We claim:

1. A method for presenting a plurality of television (TV) functions on a TV screen, comprising:

displaying on the TV screen a rotatable spherical function menu;

displaying in the spherical function menu, one or more function representations, each function representation identifying a function;

displaying an exit icon near the spherical function menu, the exit icon representing an exit function providing an exit from the method;

receiving a rotation signal; and in response to the rotation signal, causing the spherical function menu to rotate.

2. The method of claim 1, wherein displaying the spherical function menu includes displaying a substantially spherical graphics object with a plurality of facets, and displaying one or more function representations includes displaying in each facet of the plurality of facets a function representation of the one or more function representations.

3. The method of claim 1, wherein displaying the exit icon includes displaying the exit icon as a stationary panel that touches the spherical function menu.

4. The method of claim 1, wherein displaying the spherical function menu includes orienting the spherical function menu for rotation about a vertical axis.

5. The method of claim 4, wherein causing the spherical function menu to rotate includes causing rotation of the spherical function menu on the vertical axis.

6. The method of claim 1, further including displaying a submenu that includes a plurality of function representations, each function representation corresponding to a function identified by a function representation on the spherical function menu.

7. The method of claim 6, wherein, prior to displaying the submenu, the spherical function menu is rotated to a position at which the identified function is displayed and the submenu is displayed in response to display of identified function.

8. The method of claim 1, wherein the spherical function menu includes a surface with a plurality of facets, a respective one function representation of the one or more function representations being displayed in a respective facet of the plurality of facets.

9. The method of claim 1, wherein causing the spherical function menu to rotate includes providing a plurality of rotation axes and rotating the spherical function menu about one rotation axis of the plurality of rotation axes.

10. The method of claim 1, wherein displaying the ring-shaped function menu isometrically includes displaying the spherical function menu standing substantially upright.

* * * * *